US009213576B2

(12) United States Patent
Cypher et al.

(10) Patent No.: US 9,213,576 B2
(45) Date of Patent: Dec. 15, 2015

(54) EFFICIENT RESOURCE UTILIZATION IN DATA CENTERS

(71) Applicant: Google Inc., Mountain View, CA (US)

(72) Inventors: Robert Cypher, Saratoga, CA (US); Peter Dahl, Sunnyvale, CA (US); Steven Robert Schirripa, Hazlet, NJ (US)

(73) Assignee: Google Inc., Mountain View, CA (US)

( * ) Notice: Subject to any disclaimer, the term of this patent is extended or adjusted under 35 U.S.C. 154(b) by 132 days.

(21) Appl. No.: 14/169,357

(22) Filed: Jan. 31, 2014

(65) Prior Publication Data
US 2015/0220363 A1 Aug. 6, 2015

(51) Int. Cl.
G06F 9/46 (2006.01)
G06F 9/50 (2006.01)
G06F 9/48 (2006.01)

(52) U.S. Cl.
CPC ............... G06F 9/50 (2013.01); G06F 9/4856 (2013.01)

(58) Field of Classification Search
CPC ........ G06F 9/46; G06F 9/5011; G06F 9/5027
See application file for complete search history.

(56) References Cited

U.S. PATENT DOCUMENTS

| 8,380,853 | B2 | 2/2013 | Kudo |
| 8,549,519 | B2 | 10/2013 | Emaru |
| 2003/0212898 | A1 | 11/2003 | Steele et al. |
| 2004/0153748 | A1 | 8/2004 | Fabrizi et al. |
| 2004/0210895 | A1 | 10/2004 | Esfahany |
| 2007/0078982 | A1 | 4/2007 | Aidun et al. |
| 2012/0130554 | A1 | 5/2012 | Jain et al. |
| 2012/0246318 | A1 | 9/2012 | Mohammed et al. |
| 2013/0132958 | A1 | 5/2013 | Jain et al. |
| 2014/0137104 | A1* | 5/2014 | Nelson et al. ..................... 718/1 |

FOREIGN PATENT DOCUMENTS

EP 1692707 B1 2/2013
WO WO-2013076736 A2 5/2013

OTHER PUBLICATIONS

CC. Huang, M. Chen, and J. Li, "Pyramid Codes: Schemes to Trade Space for Access Effciency in Reliable Data Storage Systems," Proc. of IEEE NCA, Cambridge, MA, Jul. 2007.
Erasure Coding in Windows Azure Storage.
International Search Report and Written Opinion for related PCT Application No. PCT/US2015/012629 dated Jan. 23, 2015.

* cited by examiner

*Primary Examiner* — Camquy Truong
(74) *Attorney, Agent, or Firm* — Honigman Miller Schwartz and Cohn LLP

(57) ABSTRACT

A method includes identifying high-availability jobs and low-availability jobs that demand usage of resources of a distributed system. The method includes determining a first quota of the resources available to low-availability jobs as a quantity of the resources available during normal operations, and determining a second quota of the resources available to high-availability jobs as a quantity of the resources available during normal operations minus a quantity of the resources lost due to a tolerated event. The method includes executing the jobs on the distributed system and constraining a total usage of the resources by both the high-availability jobs and the low-availability jobs to the quantity of the resources available during normal operations.

28 Claims, 10 Drawing Sheets

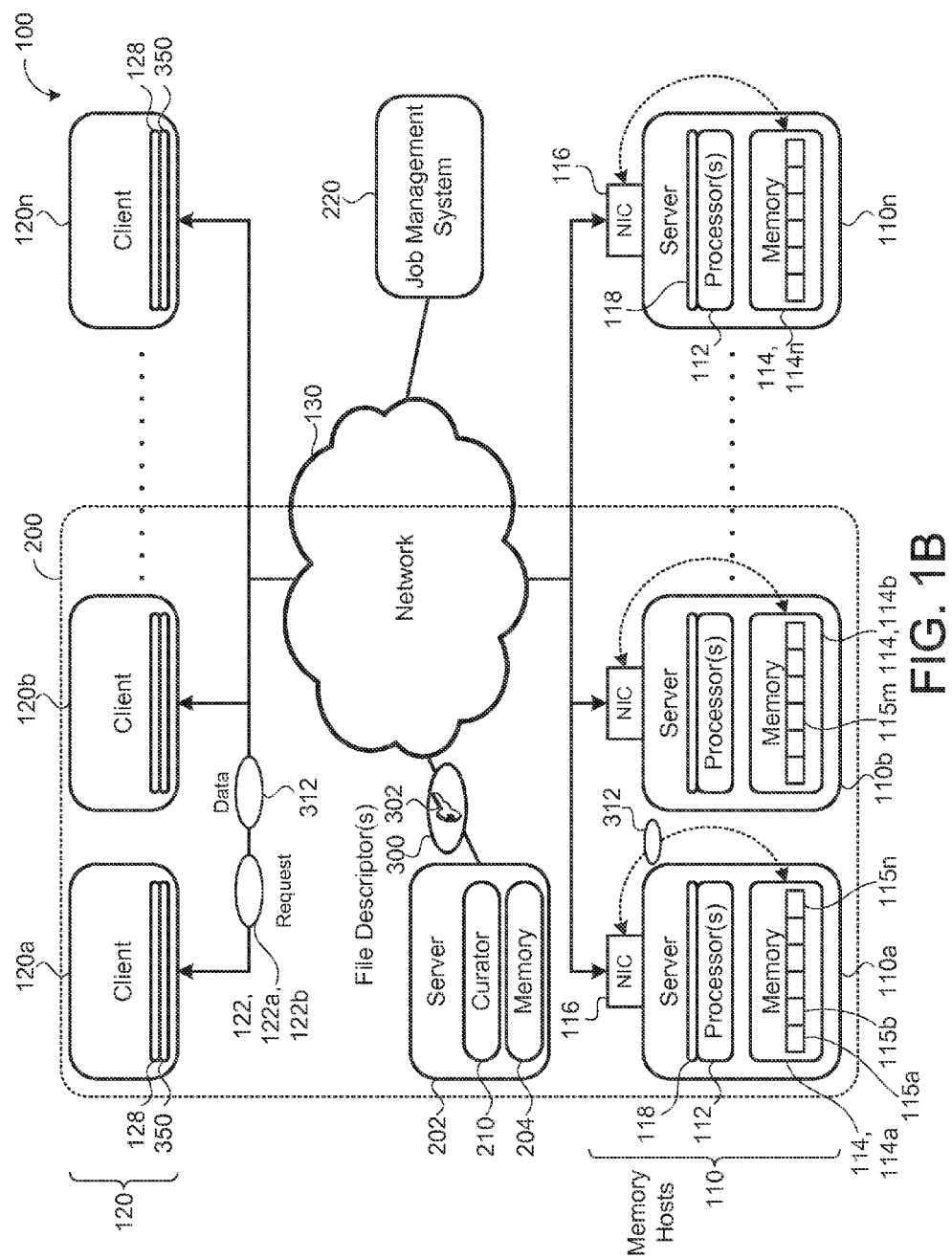

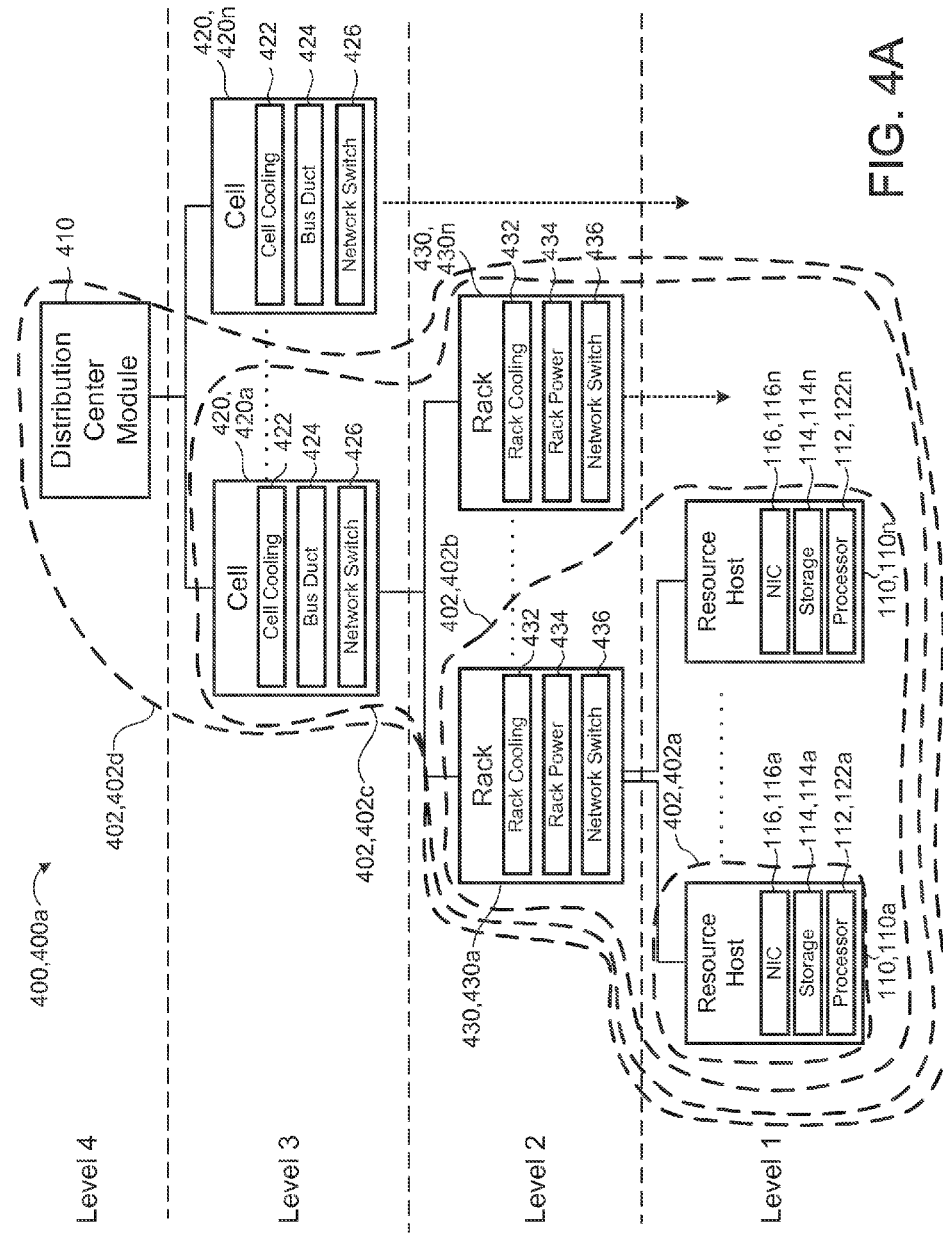

EFFICIENT RESOURCE UTILIZATION IN DATA CENTERS

TECHNICAL FIELD

This disclosure relates to efficient resource utilization in data centers upon a system failure.

BACKGROUND

A distributed system generally includes many loosely coupled computers, each of which typically includes a computing resource (e.g., one or more processors) and/or storage resources (e.g., memory, flash memory, and/or disks). A distributed storage system overlays a storage abstraction (e.g., key/value store or file system) on the storage resources of a distributed system. In the distributed storage system, a server process running on one computer can export that computer's resources to client processes running on other computers. Remote procedure calls (RPC) may transfer data from server processes to client processes. Alternatively, Remote Direct Memory Access (RDMA) primitives may be used to transfer data from server hardware to client processes.

SUMMARY

One aspect of the disclosure provides a method for efficiently using resources (e.g., processors and/or memory devices) in data centers. The method includes identifying high-availability jobs and low-availability jobs that demand usage of resources of a distributed system and determining a first quota of the resources available to low-availability jobs as a quantity of the resources available during normal operations. The method also includes determining a second quota of the resources available to high-availability jobs as a quantity of the resources available during normal operations minus a quantity of the resources lost due to a tolerated event. The method includes executing the jobs on the resources of the distributed system and constraining a total usage of the resources by both the high-availability jobs and the low-availability jobs to the quantity of the resources available during normal operations.

Implementations of the disclosure may include one or more of the following features. In some implementations, the resources include data processing devices, networking systems, power systems, or cooling systems. For these types of resources, the method may include migrating or re-executing jobs assigned to resources lost due to the tolerated event to remaining resources.

In some implementations, the resources include non-transitory memory devices (also referred to as storage resources). For this type of resource, the method may include leaving jobs assigned to the lost resources without reassigning the jobs to remaining resources and reconstructing any unavailable data associated with the lost resources. Storage resources have two types of usage: a byte usage/storage capacity; and an access bandwidth (such as the number of input/output operations per second allowed to hard disk storage or the amount of spindle utilization/access allowed for such storage). The allocation of jobs to storage resources may depend on its type of usage. In some examples, up to 100% of the normal byte usage/storage capacity may be assigned to high-availability jobs, whereas a fraction of the normal bandwidth (spindle usage) may be assigned to high-availability jobs.

The method may include determining the second quota of the resource available to high-availability jobs as the quantity of the resources available during normal operations minus the quantity of the resources lost due to a tolerated event minus an increased quantity of the remaining resources needed due to the tolerated event. Additionally or alternatively, the method may include limiting a sum of the first quota and the second quota to a maximum quota.

In some implementations, the method includes monitoring a usage of the resources by the high-availability jobs. When a high-availability job exceeds a threshold usage, the method includes downgrading the high-availability job to a low-availability job. The method may include lowering the first quota of the resources available to low-availability jobs for a period of time before the tolerated event and increasing the second quota of the resources available to high-availability jobs for the period of time before the tolerated event. Additionally or alternatively, the method may include suspending or ending at least some of the low-availability jobs for the period of time before the tolerated event.

In some examples, the method includes determining the quantity of the resources lost due to a tolerated event based on an assignment of the jobs to particular resources and a system hierarchy of the distributed system. The system hierarchy includes system domains. Each system domain has an active state or an inactive state. The system hierarchy may include system levels, such as first, second, third, and fourth system levels. The first system level corresponds to host machines of data processing devices, non-transitory memory devices, or network interface controllers. Each host machine has a system domain. The second system level corresponds to power deliverers, communication deliverers, or cooling deliverers of racks housing the host machines. Each power deliverer, communication deliverer, or cooling deliverer of the rack has a system domain. The third system level corresponds to power deliverers, communication deliverers, or cooling deliverers of cells having a system domain. Each power deliverer, communication deliverer, or cooling deliverer of the cell has a system domain. The fourth system level corresponds to a distribution center module of the cells, each distribution center module having a system domain.

Another aspect of the disclosure provides a system for efficiently utilizing resources of a distributed system. The system includes resources of a distributed system and a computer processor in communication with the resources. The computer processor identifies high-availability jobs and low-availability jobs that demand usage of the resources and determines a first quota of the resources available to low-availability jobs as a quantity of the resources available during normal operations. In addition, the computer processor determines a second quota of the resources available to high-availability jobs as a quantity of the resources available during normal operations minus a quantity of the resources lost due to a tolerated event. The processor executes the jobs on the distributed system and constrains a total usage of the resources by both the high-availability jobs and the low-availability jobs to the quantity of the resources available during normal operations.

In some implementations, the system resources include data processing devices, networking systems, power systems or cooling systems. For these types of resources, the computer processor may migrate or re-execute jobs assigned to resources lost due to the tolerated event to remaining resources.

In some implementations, the system resources include non-transitory memory devices. For this type of resource, the computer processor may leave jobs assigned to the lost resources without reassigning the jobs to remaining resources and reconstructs any unavailable data associated with the lost resources.

The computer processor may determine the second quota of the resources available to high-availability jobs as the quantity of the resources available during normal operations minus the quantity of the resources lost due to a tolerated event minus an increased quantity of the remaining resources needed due to the tolerated event. Additionally or alternatively, the computer processor may limit a sum of the first quota and the second quota to a maximum quota.

In some implementations, the computer processor monitors a usage of the resources by the high-availability jobs. When a high-availability job exceeds a threshold usage, the computer processor downgrades the high-availability job to a low-availability job. The computer processor may further lower the first quota of the resources available to low-availability jobs for a period of time before the tolerated event and increase the second quota of the resources available to high-availability jobs for the period of time before the tolerated event. Additionally or alternatively, the computer processor may suspend or end at least some of the low-availability jobs for the period of time before the tolerated event.

In some examples, the computer processor determines the quantity of the resources lost due to a tolerated event based on an assignment of the jobs to particular resources and a system hierarchy of the distributed system. The system hierarchy includes system domains. Each system domain has an active state or an inactive state. The system hierarchy may include system levels, such as first, second, third, and fourth system levels. The first system level corresponds to host machines of data processing devices, non-transitory memory devices, or network interface controllers. Each host machine has a system domain. The second system level corresponds to power deliverers, communication deliverers, or cooling deliverers of racks housing the host machines. Each power deliverer, communication deliverer, or cooling deliverer of the rack has a system domain. The third system level corresponds to power deliverers, communication deliverers, or cooling deliverers of cells having associated racks. Each power deliverer, communication deliverer, or cooling deliverer of the cell has a system domain. The fourth system level corresponds to a distribution center module of the cells, each distribution center module having a system domain.

Another aspect of the disclosure provides, a method that includes identifying high-availability jobs and low-availability jobs that demand usage of resources of a distributed system, determining a first quota of the resources available to low-availability jobs as a quantity of the resources available during normal operations, and determining a second quota of the resources available to high-availability jobs based on a resource type. For storage capacity resources, the second quota of the resources available to high-availability jobs is the quantity of the resources available during normal operations. For storage bandwidth resources, the second quota of the resources available to high-availability jobs is the quantity of the resources available during normal operations minus a quantity of the resources lost due to a tolerated event and minus an increased quantity of the remaining resources needed due to the tolerated event. For other (i.e., non-storage) resources, the second quota of the resources available to high-availability jobs is the quantity of the resources available during normal operations minus the quantity of the resources lost due to a tolerated event. The method further includes executing the jobs on the resources of the distributed system and constraining a total usage of the resources by both the high-availability jobs and the low-availability jobs to the quantity of the resources available during normal operations.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1B is a schematic view of an exemplary distributed system having a cell of resource hosts managed by a job management system.

FIGS. 4A-4B are schematic views of exemplary system hierarchies.

Like reference symbols in the various drawings indicate like elements.

DETAILED DESCRIPTION

Figure 1A:
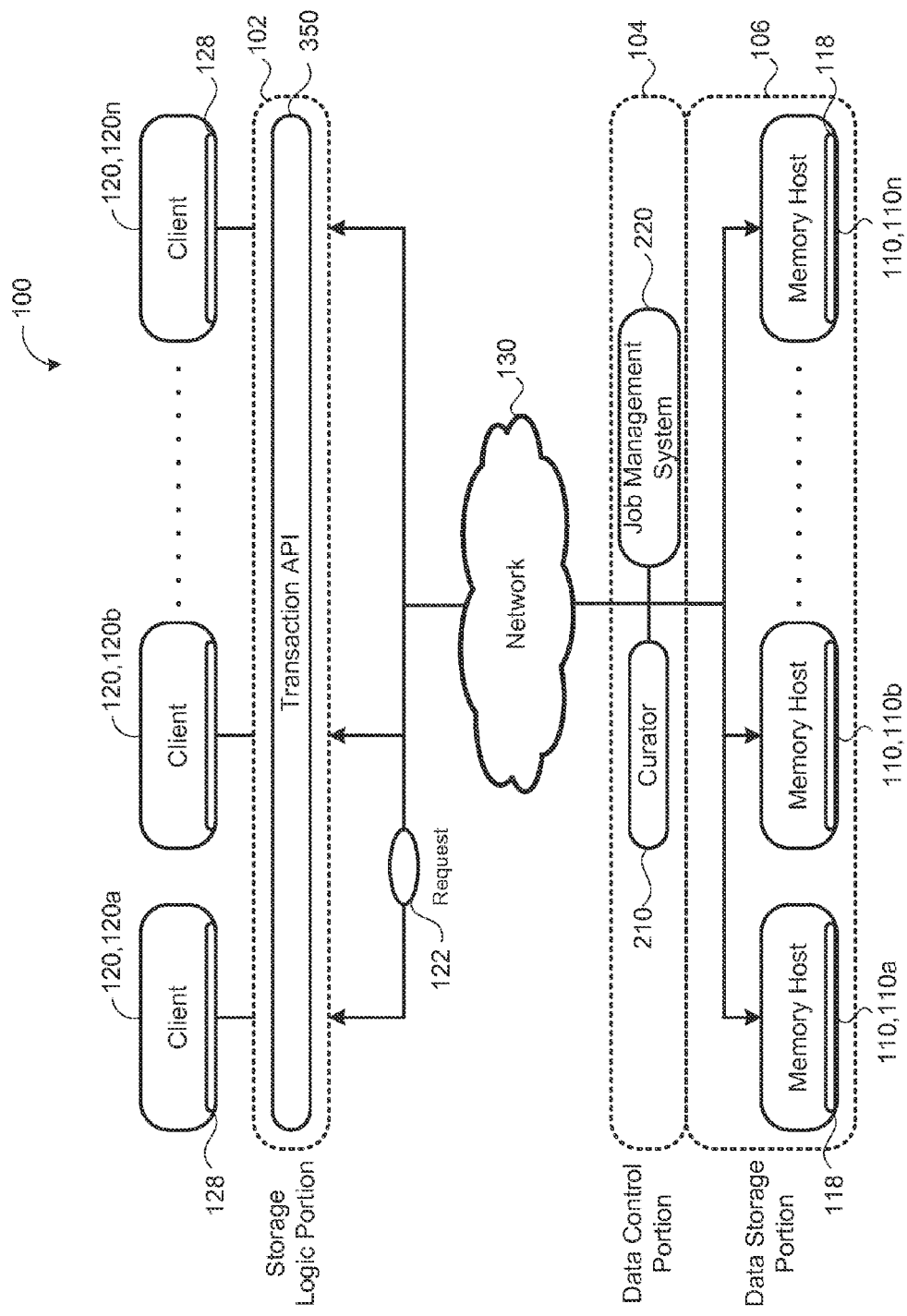
FIG. 1A is a schematic view of an exemplary distributed system.

Referring to FIGS. 1A-1B, in some implementations, a distributed system 100 includes loosely coupled resource hosts 110, 110a-n (e.g., computers or servers), each having a computing resource 112 (e.g., one or more processors or central processing units (CPUs)) in communication with storage resources 114 (e.g., memory, flash memory, dynamic random access memory (DRAM), phase change memory (PCM), and/or disks) that may be used for caching data. A storage abstraction (e.g., key/value store or file system) overlain on the storage resources 114 allows scalable use of the storage resources 114 by one or more clients 120, 120a-n. The clients 120 may communicate with the resource hosts 110 through a network 130 (e.g., via RPC).

The distributed system 100 may include multiple layers of redundancy where data 312 is replicated and stored in multiple data centers. Data centers (not shown) house computer systems and their associated components, such as telecommunications and distributed systems 100. Data centers usually include backup power supplies, redundant communications connections, environmental controls (to maintain a constant temperature), and security devices. Data centers can be large industrial scale operations that use a great amount of electricity (e.g., as much as a small town). Data 312 may be located in different geographical locations (e.g., different cities, different countries, and different continents). In some examples, the data centers, or a portion thereof, requires maintenance (e.g., due to a power outage or disconnecting a portion of the system for replacing parts, or a system failure, or a combination thereof). The data 312 stored in these data centers, and in particular, the distributed system 100 may be unavailable to users/clients 120 during the maintenance period resulting in the impairment or halt of a user's operations. Therefore, it is desirable to provide a distributed system 100 capable of efficiently using the resource hosts 110, the processors 112, storage resources 114, and the network resources of the system 100 during maintenance and/or failure of the system 100 or portions thereof.

In some implementations, the distributed system 100 is "single-sided," eliminating the need for any server jobs for responding to remote procedure calls (RPC) from clients 120 to store or retrieve data 312 on their corresponding resource hosts 110 and may rely on specialized hardware to process remote requests 122 instead. "Single-sided" refers to the method by which most of the request processing on the resource hosts 110 may be done in hardware rather than by software executed on CPUs 112 of the resource hosts 110. Rather than having a processor 112 of a resource host 110 (e.g., a server) execute a server process 118 that exports access of the corresponding storage resource 114 (e.g., non-transitory memory) to client processes 128 executing on the clients 120, the clients 120 may directly access the storage resource 114 through a network interface controller (NIC) 116 of the resource host 110. In other words, a client process 128 executing on a client 120 may directly interface with one or more storage resources 114 without requiring execution of a routine of any server processes 118 executing on the computing resources 112. This single-sided distributed architecture offers relatively high-throughput and low latency, since clients 120 can access the storage resources 114 without interfacing with the computing resources 112 of the resource hosts 110. This has the effect of decoupling the requirements for storage 114 and CPU cycles that typical two-sided distributed systems 100 carry. The single-sided distributed system 100 can utilize remote storage resources 114 regardless of whether there are spare CPU cycles on that resource host 110; furthermore, since single-sided operations do not contend for server CPU 112 resources, a single-sided system can serve cache requests 122 with very predictable, low latency, even when resource hosts 110 are running at high CPU utilization. Thus, the single-sided distributed system 100 allows higher utilization of both cluster storage 114 and CPU 112 resources than traditional two-sided systems, while delivering predictable, low latency.

In some implementations, the distributed system 100 includes a storage logic portion 102, a data control portion 104, and a data storage portion 106. The storage logic portion 102 may include a transaction application programming interface (API) 350 (e.g., a single-sided transactional system client library) that is responsible for accessing the underlying data, for example, via RPC or single-sided operations. The data control portion 104 may manage allocation and access to storage resources 114 with tasks, such as allocating storage resources 114, registering storage resources 114 with the corresponding network interface controller 116, setting up connections between the client(s) 120 and the resource hosts 110, handling errors in case of machine failures, etc. The data storage portion 106 may include the loosely coupled resource hosts 110, 110a-n.

The distributed system 100 may store data 312 in dynamic random access memory (DRAM) 114 and serve the data 312 from the remote hosts 110 via remote direct memory access (RDMA)-capable network interface controllers 116. A network interface controller 116 (also known as a network interface card, network adapter, or LAN adapter) may be a computer hardware component that connects a computing resource 112 to the network 130. Both the resource hosts 110a-n and the client 120 may each have a network interface controller 116 for network communications. A host process 118 executing on the computing processor 112 of the resource host 110 registers a set of remote direct memory accessible regions 115a-n of the memory 114 with the network interface controller 116. The host process 118 may register the remote direct memory accessible regions 115a-n of the memory 114 with a permission of read-only or read/write. The network interface controller 116 of the resource host 110 creates a client key 302 for each registered memory region 115a-n.

The single-sided operations performed by the network interface controllers 116 may be limited to simple reads, writes, and compare-and-swap operations, none of which may be sophisticated enough to act as a drop-in replacement for the software logic implemented by a traditional cache server job to carry out cache requests and manage cache policies. The transaction API 350 translates commands, such as look-up or insert data commands, into sequences of primitive network interface controller operations. The transaction API 350 interfaces with the data control and data storage portions 104, 106 of the distributed system 100.

The distributed system 100 may include a co-located software process to register memory 114 for remote access with the network interface controllers 116 and set up connections with client processes 128. Once the connections are set up, client processes 128 can access the registered memory 114 via engines in the hardware of the network interface controllers 116 without any involvement from software on the local CPUs 112 of the corresponding resource hosts 110.

Referring to FIGS. 1B, in some implementations, the distributed system 100 includes multiple cells 200, each cell 200 including resource hosts 110, a curator 210 in communication with the resource hosts 110, and a job management system 220 in communication with the resource hosts 110. The curator 210 (e.g., process) may execute on a computing processor 202 (e.g., server having a non-transitory memory 204) connected to the network 130 and manage the data storage (e.g., manage a file system stored on the resource hosts 110), control data placements, and/or initiate data recovery. Moreover, the curator 210 may track an existence and storage location of data 312 on the resource hosts 110. Redundant curators 210 are possible. In some implementations, the curator(s) 210 track the striping of data 312 across multiple resource hosts 110 and the existence and/or location of multiple copies of a given stripe for redundancy and/or performance. In computer data storage, data striping is the technique of segmenting logically sequential data 312, such as a file 310 (FIG. 2), in a way that accesses of sequential segments are made to different physical storage devices 114 (e.g., cells 200 and/or resource hosts 110). Striping is useful when a processing device requests access to data 312 more quickly than a storage device 114 can provide access. By performing segment accesses on multiple devices, multiple segments can be accessed concurrently. This provides more data access throughput, which avoids causing the processor to idly wait for data accesses. The job management system 220 schedules jobs (e.g., processing jobs or memory jobs) across the resource hosts 110.

In some implementations, the transaction API 350 interfaces between a client 120 (e.g., with the client process 128) and the curator 210. In some examples, the client 120 communicates with the curator 210 through one or more remote procedure calls (RPC). In response to a client request 122, the transaction API 350 may find the storage location of certain data 312 on resource host(s) 110 and obtain a key 302 that allows access to the data 312. The transaction API 350 communicates directly with the appropriate resource hosts 110 (via the network interface controllers 116) to read or write the data 312 (e.g., using remote direct memory access). In the case that a resource host 110 is non-operational, or the data 312 was moved to a different resource host 110, the client request 122 fails, prompting the client 120 to re-query the curator 210.

Figure 2:
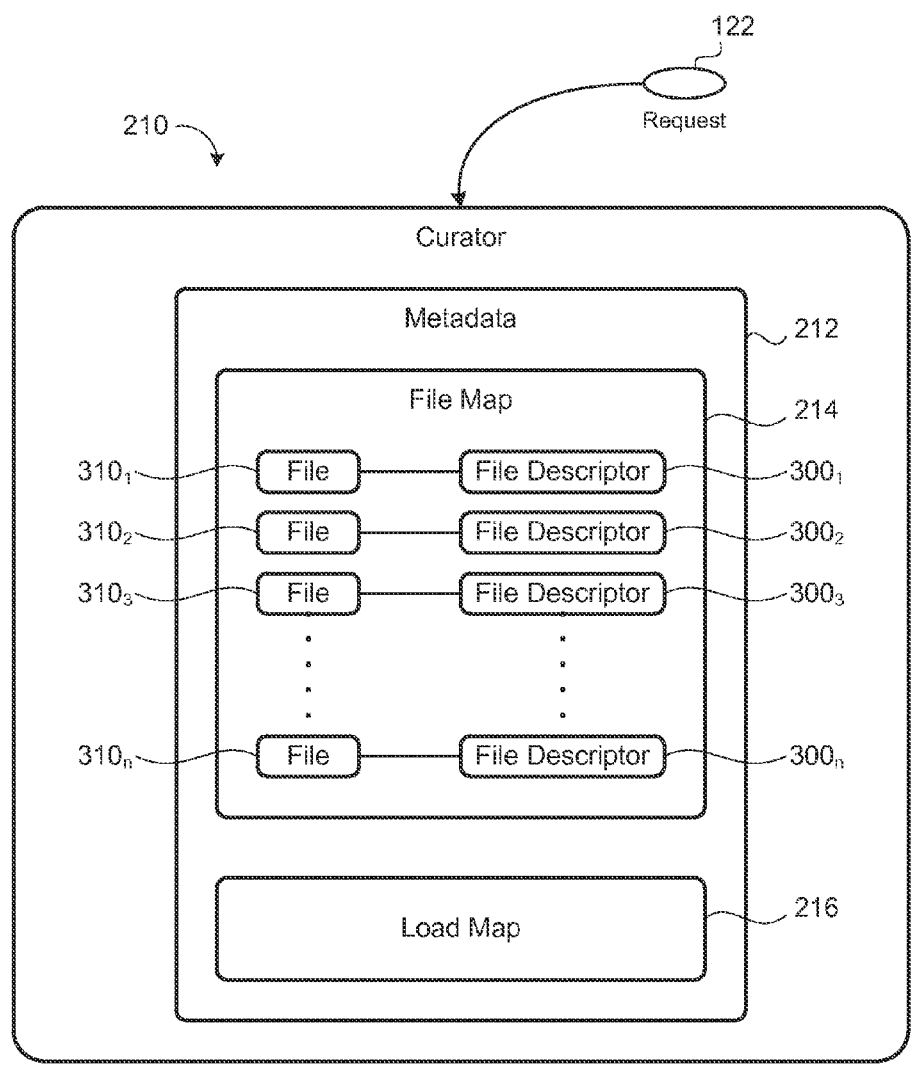
FIG. 2 is a schematic view of an exemplary curator for a distributed system.

Referring to FIG. 2, in some implementations, the curator 210 stores and manages file system metadata 212. The metadata 212 may include a file map 214 that maps files $310_{1-n}$ to file descriptors $300_{1-n}$. The curator 210 may examine and modify the representation of its persistent metadata 212. The curator 210 may use three different access patterns for the metadata 212: read-only; file transactions; and stripe transactions.

Figure 3A:
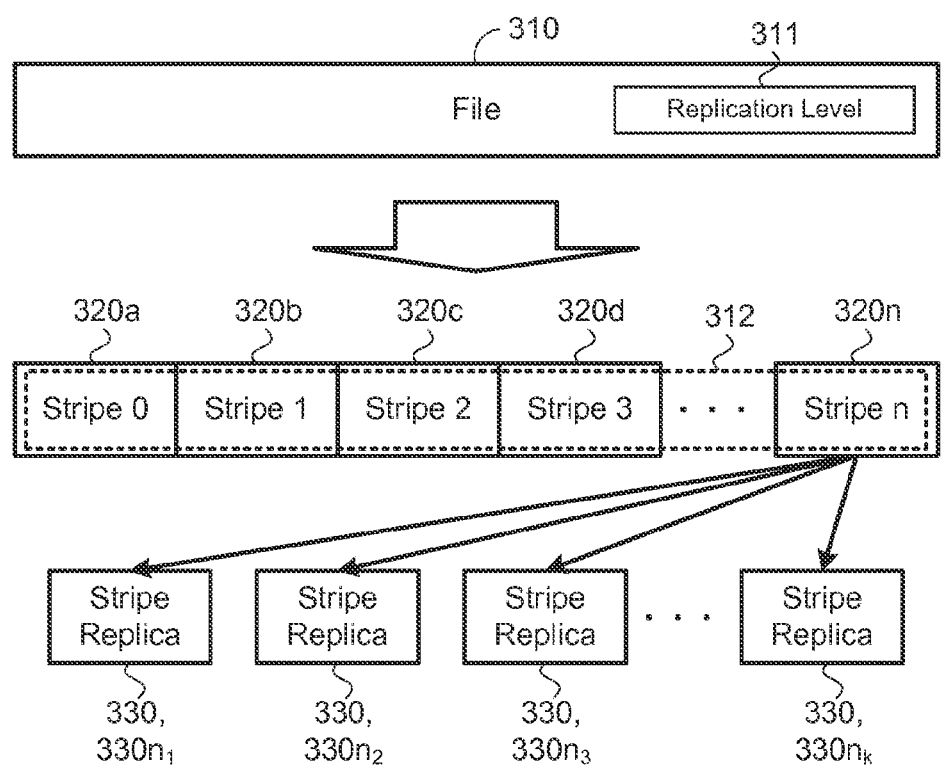
FIG. 3A is a schematic view of an exemplary file split into replicated stripes.
Figure 3B:
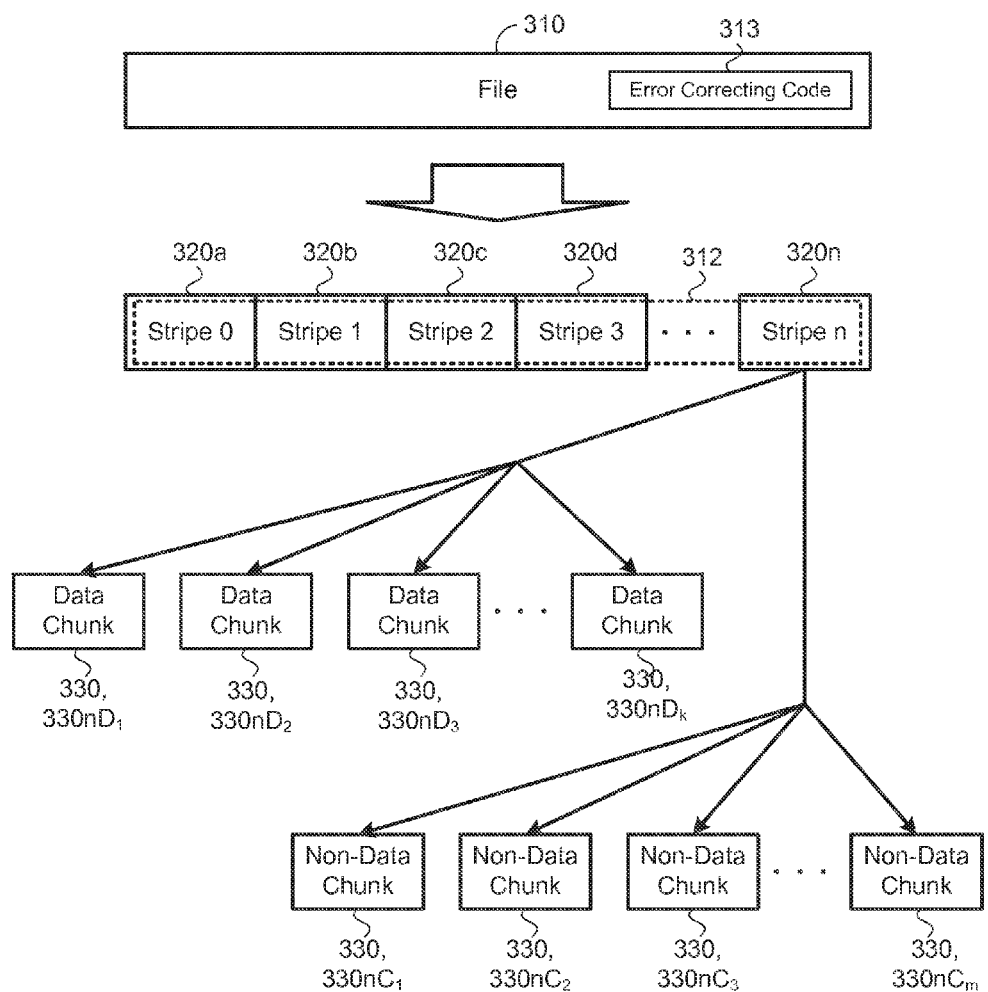
FIG. 3B is a schematic view of an exemplary file split into data chunks and non-data chunks.

Referring to FIGS. 3A and 3B, data 312 may be one or more files 310, where each file 310 has a specified replication level 311 and/or error-correcting code 313. The curator 210 may divide each file 310 into a collection of stripes 320a-n, with each stripe 320a-n being replicated or encoded independently from the remaining stripes 320a-n. For a replicated file 310 (FIG. 3A), each stripe 320a-n is a single logical chunk that the curator 210 replicates as stripe replicas 330n and stores on multiple storage resources 114. In that scenario, a stripe replica 330n is also referred to as a chunk 330n. For an encoded file 310 (FIG. 3B), each stripe 320a-n consists of multiple data chunks $330nD_k$ and non-data chunks 330nC (e.g., code chunks) that the curator 210 places on multiple storage resources 114, where the collection of data chunks 330nD and non-data chunks 330nC forms a single code word. In general, the curator 210 may place each stripe 320a-n on storage resources 114 independently of how the other stripes 320a-n in the file 310 are placed on the storage resources 114. The error-correcting code 313 adds redundant data, or parity data to a file 310, so that the file 310 can later be recovered by a receiver even when a number of errors (up to the capability of the code being used) were introduced. The error-correcting code 313 is used to maintain data 312 integrity in storage devices, to reconstruct data 312 for performance (latency), or to more quickly drain machines.

Referring back to FIG. 2, in some implementations, file descriptors $300_{1-n}$ stored by the curator 210 contain metadata 212, such as the file map 214, which maps the stripes 320a-n to stripe replicas 330n or to data chunks 330nD and code chunks 330nC, as appropriate, stored on the resource hosts 110. To open a file 310, a client 120 sends a request 122 to the curator 210, which returns a file descriptor 300. The client 120 uses the file descriptor 300 to translate file chunk offsets to remote memory locations 115a-n. The file descriptor 300 may include a client key 302 (e.g., a 32-bit key) that is unique to a chunk 330n on a resource host 110 and is used to RDMA-read that chunk 330n. After the client 120 loads the file descriptor 300, the client 120 may access the data 312 of a file 310 via RDMA or another data retrieval method.

The curator 210 may maintain status information for all resource hosts 110 that are part of the cell 200. The status information may include capacity, free space, load on the resource host 110, latency of the resource host 110 from a client's point of view, and a current state. The curator 210 may obtain this information by querying the resource hosts 110 in the cell 200 directly and/or by querying a client 120 to gather latency statistics from a client's point of view. In some examples, the curator 210 uses the resource host status information to make rebalancing, draining, recovery decisions, and allocation decisions.

The curator(s) 210 may allocate chunks 330 in order to handle client requests 122 for more storage space in a file 310 and for rebalancing and recovery. In some examples, the processor 202 replicates chunks 330n among the storage devices 114 differently than distributing the data chunks 330nD and the code chunks 330nC among the storage devices 114. The curator 210 may maintain a load map 216 of resource host load and liveliness. In some implementations, the curator 210 allocates a chunk 330 by generating a list of candidate resource hosts 110 and sends an allocate chunk request to each of the candidate resource hosts 110. If the resource host 110 is overloaded or has no available space, the resource host 110 can deny the request. In this case, the curator 210 selects a different resource host 110. Each curator 210 may continuously scan its designated portion of the file namespace, examining all the metadata 212 every minute or so. The curator 210 may use the file scan to check the integrity of the metadata 212, determine work that needs to be performed, and/or to generate statistics. The file scan may operate concurrently with other operations of the curator 210. The scan itself may not modify the metadata 212, but schedules work to be done by other components of the system and computes statistics.

Figure 4B:
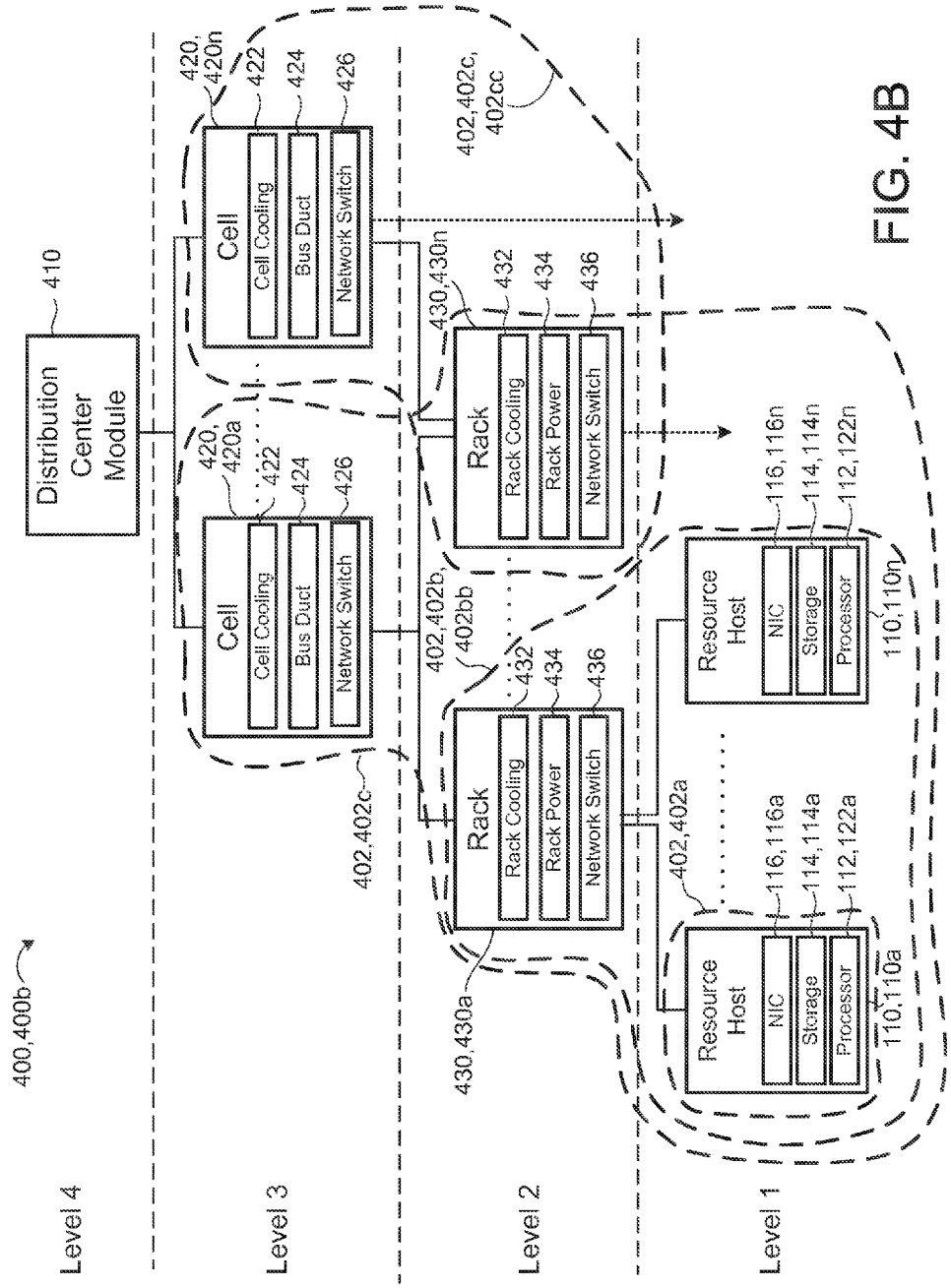

Referring to FIGS. 4A-4B, the job management system 220 may determine or receives a system hierarchy 400 of the distributed system 100 to identify the levels (e.g., levels 1-4) at which maintenance or failure may occur without affecting a user's access to stored data 312 and/or the processors 112 allowing access to the stored data 312. Maintenance or failures (strict hierarchy 400a (FIG. 4A), non-strict hierarchy 400b (FIG. 4B)) may include power maintenance/failure, cooling system maintenance/failure, networking maintenance/failure, updating or replacing parts, or other maintenance or power outage affecting the distributed system 100. Maintenance may be scheduled and in some examples, an unscheduled system failure may occur.

The system hierarchy 400 includes system levels (e.g., levels 1-5) with maintenance units/system domains 402 spanning one or more system levels 1-5. Each system domain 402 has an active state or an inactive state. A distribution center module 410 includes one or more cells 420, 420a-n, and each cell 420 includes one or more racks 430 of resource hosts 110. Each cell 420 also includes cell cooling 422, cell power 424 (e.g., bus ducts), and cell level networking 426 (e.g., network switch(es)). Similarly, each rack 430 includes rack cooling 432, rack power 434 (e.g., bus ducts), and rack level networking 436 (e.g., network switch(es)).

The system levels may include first, second, third, and fourth system levels 1-4. The first system level 1 corresponds to resource hosts or host machines 110, 110a-n of data processing devices 112, non-transitory memory devices 114, or network devices 116 (e.g., NICs). Each host machine/resource host 110 has a system domain 402. The second system level 2 corresponds to racks 430, 430a-n and cooling deliverers 432, power deliverers 434 (e.g., bus ducts), or communication deliverers 436 (e.g., network switches and cables) of the host machines 110 at the rack level. Each rack 430 or rack level-cooling deliverer 432, -power deliverer 434, or -communication deliverer 436 has a system domain 402. The third system level 3 corresponds to any cells 420, 420a-n of the distribution center module 410 and the cell cooling 422, cell power 424, or cell level networking 426 supplied to the associated racks 430. Each cell 420 or cell cooling 422, cell power 424, or cell level networking 426 has a system domain 402. The fourth system level 4 corresponds to the distribution center module 410. Each distribution center 410 module has a system domain 402.

FIG. 4A shows a strict system hierarchy 400a where each hierarchy component (e.g., a resource host 110, a rack 430, a cell 420, or a distribution center module 410) of the system hierarchy 400 depends on one other hierarchy component 110, 410, 420, 430. While FIG. 4B shows a non-strict system hierarchy 400b, where one hierarchy component 110, 410, 420, 430 has more than one input feed. In some examples, job management system 220 stores the system hierarchy 400 on the non-transitory memory 204 of its processor 202. For example, the job management system 220 maps a first resource host 110 (and its corresponding processor resource 112a and storage resource 114a) to a first rack 430a, the first rack 430a to a first bus duct 420a, and the first bus duct 420a to a first distribution center module 410a.

The job management system 220 determines, based on the mappings of the hierarchy components 110, 410, 420, 430, which resource hosts 110 are inactive when a hierarchy component 110, 410, 420, 430 is undergoing maintenance. Once the job management system 220 maps the system domains 402 to the resource hosts 110 (and therefore to their corresponding processor resources 112a and storage resources 114a), the job management system 220 determines a highest level (e.g., levels 1-4) at which maintenance can be performed while maintaining processor or data availability.

A system domain 402 includes a hierarchy component 110, 410, 420, 430 undergoing maintenance and any hierarchy components 110, 410, 420, 430 depending therefrom. Therefore, when one hierarchy component 110, 410, 420, 430 undergoes maintenance, that hierarchy component 110, 410, 420, 430 is inactive and any other hierarchy components 110, 410, 420, 430 in the system domain 402 of the hierarchy component 110, 410, 420, 430 are also inactive. For example, when a resource host 110 is undergoes maintenance, a level 1 system domain 402a, which includes the storage device 114, the data processor 112, and the NIC 116, is in the inactive state. When a rack 430 undergoes maintenance, a level 2 system domain 402b, which includes the rack 430 and any resource hosts 110 depending from the rack 430, is in the inactive state. When a cell component 420 (for example, to any one of the cell cooling component 422, the bust duct 424, and/or the network switch 426 of the cell component 420a) undergoes maintenance, a level 3 system domain 402c, which includes the cell 420 and any hierarchy components 110, 410, 420, 430 in levels 3 and 4 that depend from the cell component 420, is in the inactive state. Finally, when a distribution center module 410 undergoes maintenance, a level 4 system domain 402, 402d, which includes the distribution center module 410a and any hierarchy components 110, 410, 420, 430 in levels 2 to 4 depending from the distribution center module 410, is in the inactive state.

In some examples, as shown in FIG. 4B, a non-strict hierarchy component 410, 420, 430, 114 may have dual feeds, i.e., the hierarchy component 110, 410, 420, 430 depends on two or more other hierarchy components 110, 410, 420, 430. For example, a cell component 420 may have a feed from two distribution center modules 410; and/or a rack 430 may have a dual feed from two cell components 420. As shown, a level 2 system domain 402b may include two racks 430a, 430n, where the second rack 430n includes two feeds from two cell components 420a, 420n. Therefore, the second rack 430n is part of two system domains 402bb and 402cc. Therefore, the lower levels of the system hierarchy 400 are maintained without causing the loss of the higher levels of the system hierarchy 400. This causes a redundancy in the distributed system 100 which allows the for data accessibility. In particular, the distribution center module 410 may be maintained without losing any of the cell components 420 depending from it. In some examples, the racks 430 include a dual-powered rack that allows the maintenance of the bus duct 424 without losing power to the dual-powered racks 430 depending from it. In some examples, system domains 402 that may be maintained without causing outages are ignored when distributing chunks 330n to allow for maintenance; however, the ignored system domains 402 may be included when distributing the chunks 330n since an unplanned outage may still cause the loss of chunks 330n.

In some examples, a cooling device, such as the cell cooling 422 and the rack cooling 432, are used to cool the cell components 420 and the racks 430, respectively. The cell cooling component 422 may cool one or multiple cell components 420. Similarly, a rack cooling component 432 may cool one or more racks 430. The curator 210 stores the association of the resource hosts 110 with the cooling devices (i.e., the cell cooling 422 and the rack cooling 432). In some implementations, the job management system 220 considers all possible combinations of maintenance that might occur within the system 100 to determine a system hierarchy 400 or a combination of maintenance hierarchies 400, before storing the association of the resource hosts 110 with the cooling devices 422, 432. For example, a system hierarchy 400 where one or more cooling devices 422, 432 fail, or a system hierarchy 400 where the network devices 116, 426, 436 fail, or a system hierarchy 400 where the power distribution 424, 434 fails.

Therefore, when a hierarchy component 110, 410, 420, 430 in the system 100 undergoes maintenance or fails, that hierarchy component 110, 410, 420, 430 and any hierarchy components 110, 410, 420, 430 that are mapped to or depending from that hierarchy component 110, 410, 420, 430 are in an inactive state. A hierarchy component 110, 410, 420, 430 in an inactive state is inaccessible by a user 120, while a hierarchy component 110, 410, 420, 430 in an active state is accessible by a user 120, allowing the user 120 to process/access data 312 stored/supported/maintained by that hierarchy component 110, 410, 420, 430. As previously mentioned, during the inactive state, a user 120 is incapable of accessing the resource host 110 associated with the system domains 402 undergoing maintenance; and therefore, the user 120 is incapable of accessing the files 310 (i.e., chunks 330, which include stripe replicas 330n, data chunks 330nD and non-data chunks 330nC).

In some implementations, the curator 210 restricts a number of chunks 330 distributed to storage devices 114 of any one system domain 402, e.g., based on the mapping of the hierarchy components 110, 410, 420, 430. Therefore, if a level 1 system domain 402 is inactive, the curator 210 maintains accessibility to the file 310 (or stripe 320) although some chunks 330 may be inaccessible. In some examples, for each file 310 (or stripe 320), the curator 210 determines a maximum number of chunks 330 that may be placed within any storage device 114 within a single system domain 402, so that if a system domain 402 associated with the storage device 114 storing chunks 330 for a file 310 is undergoing maintenance, the curator 210 may still retrieve the file 310. The maximum number of chunks 330 ensures that the curator 210 is capable of reconstructing the file 310 although some chunks 330 may be unavailable. In some examples, the maximum number of chunks 330 is set to a lower threshold to accommodate for any system failures, while still being capable of reconstructing the file 310 from the chunks 330. When the curator 210 places chunks 330 on the storage devices 114, the curator 210 ensures that within a stripe 320, no more than the maximum number of chunks 330 are inactive when a single system domain 402 undergoes maintenance. Moreover, the curator 210 may also restrict the number of processing jobs on a data processor 112 of a resource host 110 within a system domain 402, e.g., based on the mapping of the hierarchy components 110, 410, 420, 430. Therefore, if a level 1 system domain 402 is inactive, the curator 210 maintains accessibility to the jobs although some of the processors 112 of the resource hosts 110 are inactive.

Figure 5:
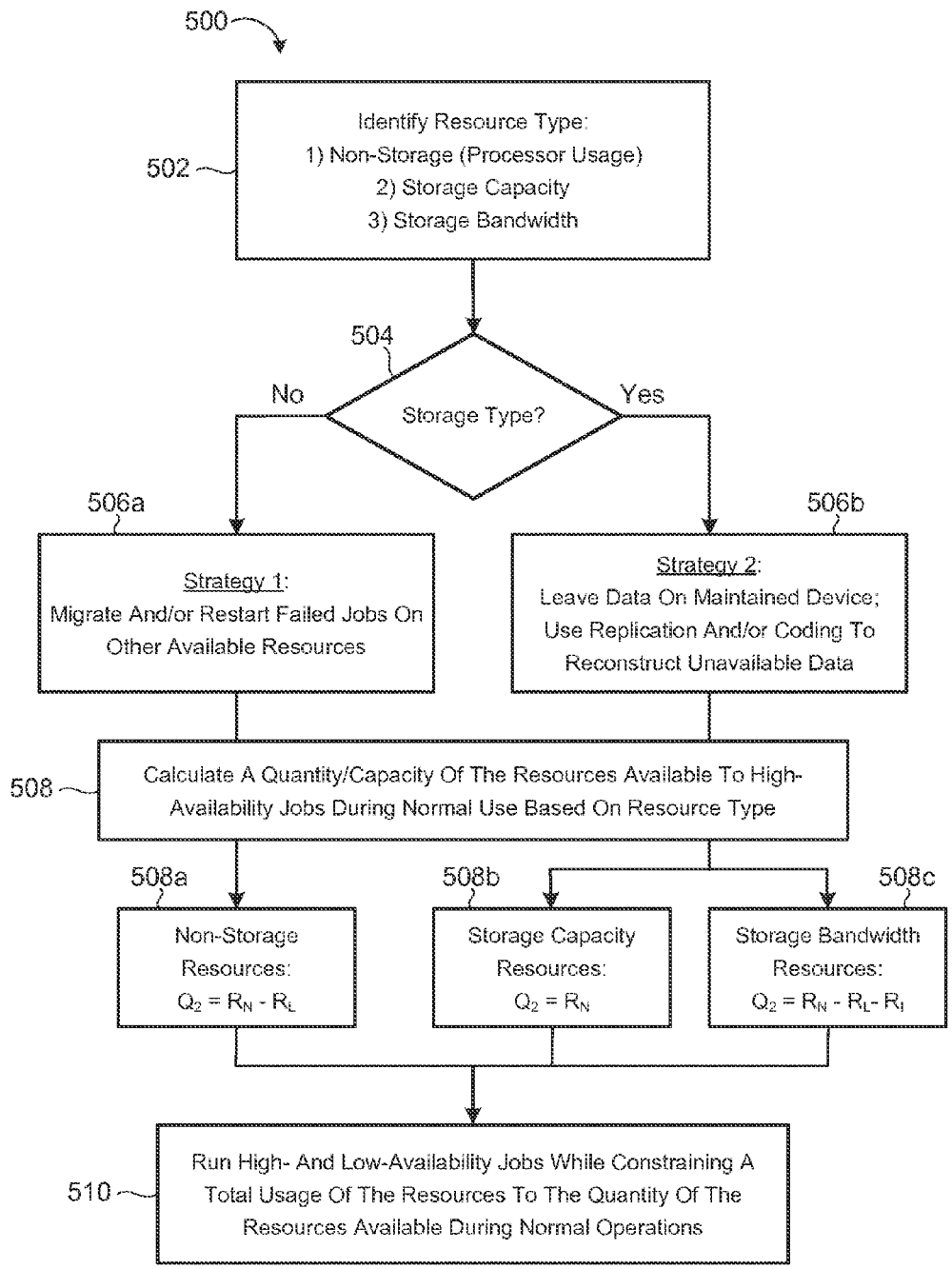
FIG. 5 is a flow chart of an exemplary arrangement of operations for efficiently using storage resources and data processors when a maintenance event occurs.

Referring to FIG. 5, in some implementations, the system 100 follows the operations 500 shown for efficiently using storage resources 114 and data processors 112 when a maintenance event occurs. The system 100 identifies, at step 502, a resource type: 1) non-storage resources (e.g., computing usage of a data processor 112, networking, power delivery, cooling, etc.); 2) storage capacity resources (e.g., a byte usage/storage capacity of a storage device 114); or 3) storage bandwidth resources (e.g., a number of input/output operations per second allowed to hard disk storage or the amount of spindle utilization/access allowed for such storage).

The system 100 also identifies two classes of jobs/requests 122. A first class of jobs 122 includes high-availability jobs 122a and a second class includes standard or low-availability jobs 122b (FIG. 1B). The system 100 executes processing jobs 122 on the processor 112 of the resource host 110 and storage jobs 122 for accessing/storing data 312 on the storage devices 114 of the resource hosts 110. The high-availability jobs 122a are jobs 122 that have a higher priority than the low-availability jobs 122b, when both types of jobs 122a, 122b are within a quota (discussed below).

In some implementations, when the system 100 designates which types of resource losses may be tolerated, the system 100 determines a strategy, at step 504, for tolerating that loss based on whether the loss includes a loss of data processors 112 or memory devices 114 or both. For non-storage resource usage, the job management system 220 uses a first strategy 506a of migrating and/or restarting jobs 122 from failed non-storage resources (e.g., data processor 112) to other available non-storage resources. For storage resource usage, the job management system 220 uses a second strategy 506b of leaving jobs 122 accessing failed storage resources 114 in place (at least for a certain period of time) and/or may use data reconstruction to retrieve unavailable data 312. In some examples, the first strategy handles resources 110 relating to computing resources 112 (e.g., computation or networking); and the second strategy handles storage resources 114 (e.g., storage devices, such as hard disks and flash memory). When a failure/loss occurs, the job management system 220 may determine whether the loss is a loss of data processors 112 or storage device 114. If the loss is a loss of storage devices 114, the job management system 220 employs strategy 2 at step 506b; otherwise, the job management system 220 employs strategy 1 at step 506a.

When the job management system 220 employs the first strategy (at step 506a) that relates to data processors 112 (i.e., computation and networking), the job management system 220 migrates and/or re-executes high-availability computing jobs 122 assigned to data processors 112 lost due to tolerated events to the remaining available data processors 112. For example, if a certain power or network maintenance event renders 10% of the data processors 112 unavailable, the job management system 220 moves the jobs 122 to run on the remaining 90% of the data processors 112.

When the job management system 220 employs the second strategy (at step 506b) used for storage resources 114, the job management system 220 leaves the data 312 stored on the storage devices 114 that are in the inactive state during the maintenance or failure events, and allows the system 100 to use the replication and/or coding (discussed with respect to FIGS. 3A and 3B) to reconstruct the unavailable data 312. In some examples, the system 100 employs the first and second strategies simultaneously.

Once the system 100 determines which strategy to use, the system 100 calculates the quantity (i.e., a quota Q) of each resource 110 (i.e., the storage resource 114 and the data processor resource 112) that is available to the jobs 122 during normal use (i.e., when the system 100 is not undergoing maintenance) at step 508.

The job management system 220 determines a first quota $Q_1$ and a second quota $Q_2$ of available resources 110. The first quota $Q_1$ of available resources 110 includes resources 110 available to low-availability jobs 122b and is a quantity of the resources 110 available during normal operations (i.e., when the system 100 is not undergoing maintenance or a failure). The second quota $Q_2$ of available resources 110 includes resources 110 available to high-availability jobs 122b and is a quantity of the resources 110 available during normal operations. When infrequent maintenance or a failure event occurs, the low-availability jobs 122b encounter insufficient resources 110, which results in degraded or nonexistent performance. The total available quota or job capacity Q may be calculated using the following equation:

$$Q = Q_1 + Q_2 \qquad (1)$$

where Q is the total available quota of resources 110 demanded by the jobs 122 (high-availability and low-availability), $Q_1$ is the first quota, and $Q_2$ is the second quota. Since the total available demanded quota/capacity Q may exceed the quantity of resources available during normal operations $R_N$, the job management system 220 constrains a total usage of the resources 110 by both the high-availability jobs 122a and the low availability jobs 122b to the quantity of the resources 110 that are available during normal operations $R_N$ (i.e., when the system 100 is not undergoing maintenance or a failure) to ensure that the number of jobs 122 allocated to the resources 110 does not exceed an actual available capacity of the resources 110 (e.g., $R_N$). The system 100 may use equation 1 to determine the available quota Q for storage resources 114 and processing resources 112. The available quota Q may be the capacity, a capacity percentage, a bandwidth, or a size measurement of the resources.

In some examples, the system 100 lowers the first quota $Q_1$ of the resources 110 available to low-availability jobs 122b for a period of time before the tolerated event (i.e., maintenance event or system failure) and increases the second quota $Q_2$ of the available resources 110 to high-availability jobs 122a for the period of time before the tolerated event. Additionally or alternatively, the system 100 may suspend or end at least some of the low-availability jobs 122b for the period of time before the tolerated event. This allows the system 100 to move the high-availability jobs 122a to the available resources 110.

In some implementations, the system 100 may determine the quantity of the resources 110 lost due to a tolerated event based on an assignment of the jobs 122 to particular resources 110 associated with the system hierarchy 400 (FIGS. 4A and 4B) of the distributed storage system 100. In some implementations, the job management system 220 designates certain types of host resource 110 losses as "tolerated" when a planned maintenance or failure occurs. The quota Q available to these jobs 122 is reduced by the maximum amount of loss that is tolerated, while maintaining data accessibility and data processing accessibility. The system hierarchy 400a, 400b, the distribution center module 410, the cell component 420, the rack 430, or the resource host 110 may be designated as being tolerated.

In some examples, during normal operations of the system 100, 100% of the resources 110 are available for storing data 312 on the storage devices 114 or for processing the data 312 on the data processors 112 of the resource hosts 110. A "largest" tolerated event (i.e., maintenance event or system failure) may result in a loss of 20% of the available resources 110, based on the system hierarchy 400 and the assignment of the resources 110 to system domains 402. This leaves 80% of the resources 110 always available despite a maximum loss of 20% of the resources 110. Therefore, job management system 220 assigns a maximum of 80% of the resources 110 to high-availability jobs 122a, allowing the system 100 to have enough resources 110 when a scheduled maintenance or system failure occurs. If the job management system 220 reassigns jobs 122 related to the data processor 212 to 80% of available processors 212, then the system 100 will have enough processors 212 to execute the high-availability jobs 122a. In addition, if the system 100 has to reconstruct data 312 unavailable due to the inactive state of the system domain 402 that includes the storage device 114 storing the data 312, the system 100 has enough storage devices 114 that have enough chunks 330 (e.g., data chunks 330nD and non-data chunks 330nC) and replicas 330n to reconstruct the lost data 312.

When determining, at step 508a, the second quota $Q_2$ of resources 110 available to high-availability jobs 122a for non-storage resource usage (i.e., under strategy 1), the second quota $Q_2$ of available resources 110 is a quantity of the resources 110 available during normal operations minus a quantity of the resources 110 lost due to a tolerated event. Therefore, the second quota $Q_2$ may be calculated based on the following equation when the resource 110 lost is data processors 112:

$$Q_2 = R_N - R_L \qquad (2)$$

where $R_N$ is the quantity of the resources available during normal operations, and $R_L$ is the maximum quantity of the resources lost due to a tolerated event.

In some implementations, the system 100 determines the second quota $Q_2$ when the resource 110 lost is a storage device 114. When determining, at step 508b, the second quota $Q_2$ of resources 110 available to high-availability jobs 122a for storage capacity usage (i.e., under strategy 2), the second quota $Q_2$ of the storage devices 114 available to high-availability jobs 122a may equal the full amount of the resource 110 that is normally available (although the usage of that resource 110 could require redundancy of replicated chunks 330n or coded chunks 330nC, 330nD), for example, as calculated using equation 3.

$$Q_2 = R_N \qquad (3)$$

This may apply for byte usage/capacity of the storage device 114. For example, up to 100% of the byte usage/capacity of the storage device 114 can be assigned to high-availability jobs 122a.

When determining, at step 508c, the second quota $Q_2$ of resources 110 available to high-availability jobs 122a for storage bandwidth usage (i.e., under strategy 2), the second quota $Q_2$ (i.e., bandwidth or usage) of that storage resource 114 (such as the number of input/output operations per second allowed to hard disk storage or the amount of spindle utilization/access allowed for such storage) may be calculated as the amount of resource 110 normally available $R_N$ minus the largest loss $R_L$ of that resource 110 due to a tolerated event minus the increased quantity $R_I$ of that resource used due to the largest loss due to a tolerated event, as shown in the following equation:

$$Q_Z = R_N - R_L - R_I \qquad (4)$$

In some examples, the system 100 may determine the second quota $Q_2$ using the following equation when calculating the resources 110 lost are storage devices 114, such as hard disks:

$$Q_2 = \frac{(R_N - R_L)}{(R_N + x * R_L)} \qquad (5A)$$

where x is a resource multiplier corresponding to the tolerated event.

For example, if up to 10% of the hard disk spindles can be lost in a tolerated event, and if each access to the data 312 that is lost requires on average 4 times as much spindle usage (due to the need to reconstruct the data 312 using a code), then using equation 5A:

$$Q_2 = \frac{(100\% - 10\%)}{(100\% + 3*10\%)} = 69\% \qquad (5B)$$

Therefore, 69% of the spindle resource can be made available to high-availability jobs (this calculation is based on the fact that only 90% of the spindles are available and support 130% of the normal load from high-availability jobs).

Once the system 100 calculates the second quota $Q_2$ of the resource 110, the system 100 allows both low-availability jobs and high-availability jobs to run in the data center, subject to two constraints at step 510. The first constraint is that the total amount of each resource 110 used by the high-availability and the low-availability jobs 122a, 122b ($Q_1+Q_2$) cannot exceed the quantity of the resource that is normally available $R_N$, as shown in the below equation:

$$Q_1 + Q_2 \leq R_N \qquad (6)$$

The second constraint is that the amount of each resource used $Q_U$ by the high-availability jobs 122a cannot exceed the second quota $Q_2$, as shown in the following equation:

$$Q_U \leq Q_2 \qquad (7)$$

In some implementations, the job management system 220 monitors a usage of the resources 110 by the high-availability jobs 122a to ensure that they do not consume too many resources 110. When a high-availability job 122a exceeds a threshold usage, the job management system 220 downgrades the high-availability job 122a to a low-availability job 122b. When a high-availability job 122a is downgraded, the job management system 220 may terminate the downgraded job 122b, which increases the available capacity (second quota) available for the high-availability jobs 122a.

After the job management system 220 determines the quotas $Q_2$ that may be used, the job management system 220 implements the processes for accommodating the maintenance and failure events. When a maintenance or failure event decreases the amount of a resource 110 that is available, the job management system 220 may suspend, kill, evict or otherwise prevent a sufficient number of low-availability jobs 122b are from using the resource 110, so that the resource 110 is available for the high-availability jobs 122a. In addition, if these jobs 122 are serving live traffic, the amount of traffic sent to them may be reduced or diverted to other data centers.

Furthermore, in the case of planned maintenance, the job management system 220 may suspend, kill, evict or otherwise prevent some or all low-availability jobs 122b from using certain resources 110 for some amount of time prior to the maintenance in order to allow the high-availability jobs 122a to move to use those resources 110.

While the above description focused on resources 110 in a data center, the same principles can be applied at the level of a resource host 110 (machine), a rack 430, a cell 420, a network, cluster, building, site, region, or entire global collection of data centers.

Figure 6:
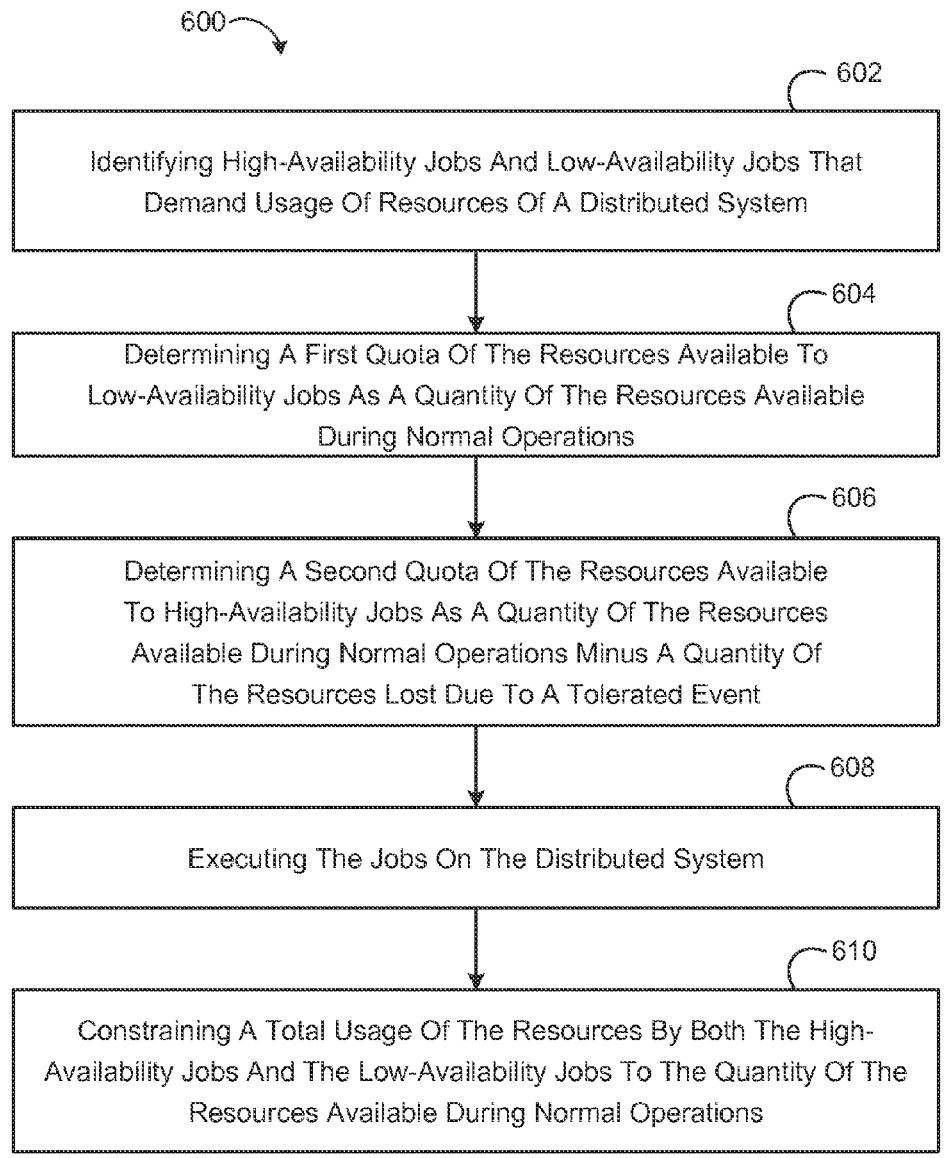
FIG. 6 is a schematic view of an exemplary arrangement of operations for efficiently using resources of a system when a maintenance/failure event occurs.

FIG. 6 provides an exemplary arrangement of operations for a method 600 of efficiently using resources 110 (e.g., processors 112 and/or resource hosts 114) in data centers. The method 600 includes identifying 602 high-availability jobs 122a and low-availability jobs 122b that demand usage of resources 110 of a distributed system 100 and determining 604 a first quota $Q_1$ of the resources 110 available to low-availability jobs 122b as a quantity of the resources 110 available during normal operations $R_N$. The method 600 also includes determining 606 a second quota $Q_2$ of the resources 110 available to high-availability jobs 122a as a quantity of the resources 110 available during normal operations minus a quantity of the resources 110 lost due to a tolerated event $R_L$. The method 600 includes executing 608 the jobs 122, 122a, 122b on the distributed system 100 and constraining a total usage of the resources 110 by both the high-availability jobs 122a and the low-availability jobs 122a to the quantity of the resources 110 available during normal operations $R_N$.

In some implementations, the resources 110, 112, 116, 422, 424, 426, 432, 434, 436 include data processing devices 112, networking systems 116, 426, 436, power systems 424, 434, or cooling systems 422, 432. For these types of resources 110, 112, 116, 422, 424, 426, 432, 434, 436, the 600 method may include migrating or re-executing jobs 122 assigned to resources 110 lost due to the tolerated event to remaining resources 110 to maintain accessibility of the data 312 or accessibility of the data processors 212.

In some implementations, the resources 110 include non-transitory memory devices 114. For this type of resources 114, the method 600 may include leaving jobs assigned to the lost resources 110 without reassigning the jobs to remaining resources 110, and reconstructing any unavailable data associated with the lost resources 110.

The method 600 may include determining the second quota $Q_2$ of the resource 110 available to high-availability jobs 122a as the quantity of the resources 110 available during normal operations $R_N$ minus the quantity of the resources 110 lost due to a tolerated event $R_L$ minus an increased quantity of the remaining resources 110 needed due to the tolerated event $R_I$. Additionally or alternatively, the method 600 may include limiting a sum of the first quota Q, and the second quota $Q_2$ to a maximum quota.

In some implementations, the method 600 includes monitoring a usage of the resources 110 by the high-availability jobs 12a. When a high-availability job 122a exceeds a threshold usage, the method 600 includes downgrading the high-availability job 122a to a low-availability job 122b.

The method 600 may further include lowering the first quota $Q_1$ of the resources 110 available to low-availability jobs 122b for a period of time before the tolerated event, and increasing the second quota $Q_2$ of the resources 110 available to high-availability jobs 122a for the period of time before the tolerated event. Additionally or alternatively, the method 600 may include suspending or ending at least some of the low-availability jobs 122b for the period of time before the tolerated event.

In some examples, the method 600 includes determining the quantity of the resources 110 lost due to a tolerated event $R_L$ based on an assignment of the jobs 122 to particular resources 110 and a system hierarchy 400 of the distributed system 100. The system hierarchy 400 includes system domains or units 402. Each system domain 402 has an active state or an inactive state. The system hierarchy 400 may include system levels, such as levels 1-4. The first system level (e.g., level 1) corresponds to resource hosts 110 having data processing devices 112, non-transitory memory devices 114 or network interface controllers 116. Each data processing device 112 or memory device 114 has one or more system domains 402. The second system level (e.g., level 2) corresponds to host machines 430 (e.g., racks) of the memory devices 114 or the data processing devices 112, each host machine having one or more system domain 402. A third system level (e.g., level 3) corresponding to power deliverers 424 (e.g., bus ducts), communication deliverers 426, or cooling deliverers 422 for the host machines 110. Each power deliverer 424, communication deliverer 426, or cooling deliverer 422 has a system domain 402. The fourth system level (e.g., level 4) corresponds to a distribution center module 410 of the power deliverer 424, communication deliverer 426, or cooling deliverer 422. Each distribution center module 410 has a system domain 402.

Figure 7:
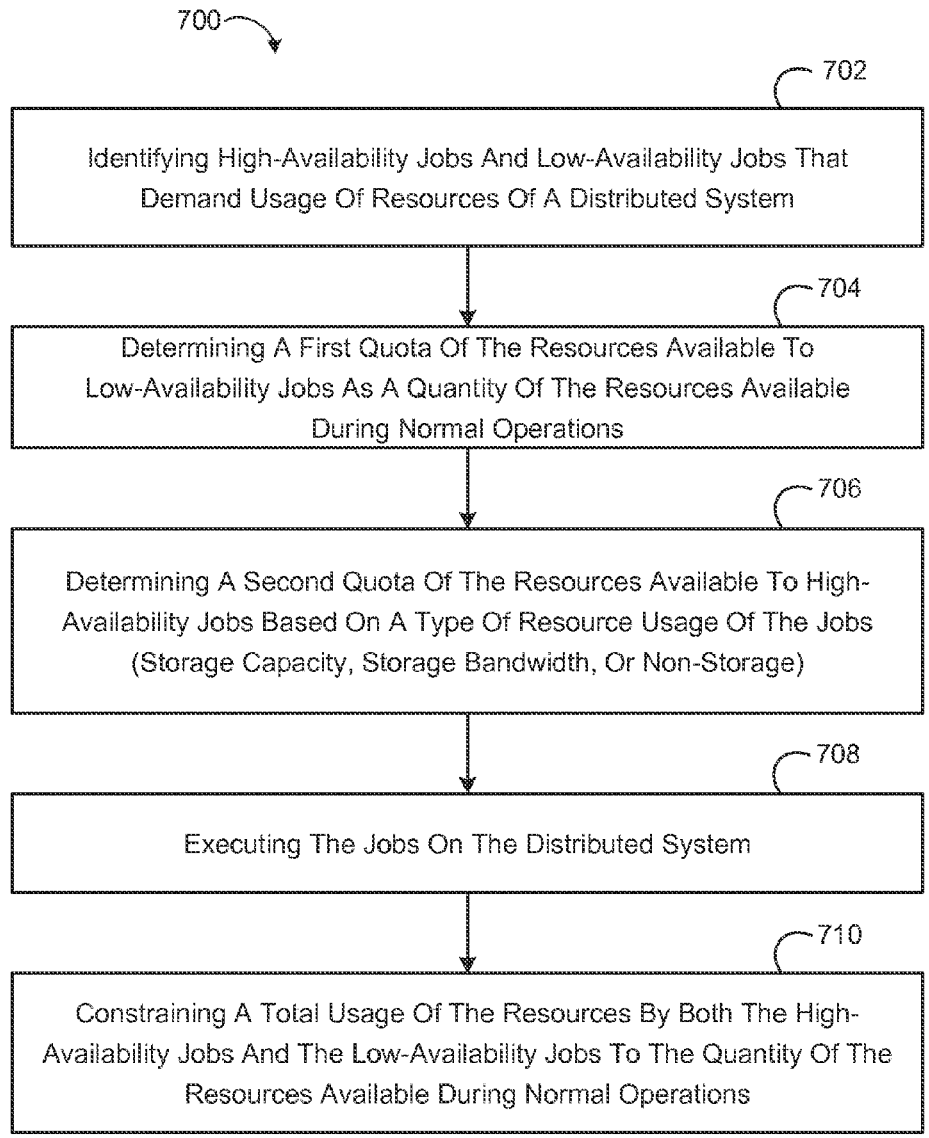
FIG. 7 is a schematic view of an exemplary arrangement of operations for efficiently using resources of a system when a maintenance/failure event occurs.

FIG. 7 provides an exemplary arrangement of operations for a method 700 of efficiently using resources 110. The method 700 includes identifying 702 high-availability jobs 122a and low-availability jobs 122b that demand usage of resources 12, 114 of a distributed system 100, determining 702 a first quota $Q_1$ of the resources 112, 114 available to low-availability jobs 122a as a quantity of the resources 112, 114 available during normal operations, and determining 706 a second quota $Q_2$ of the resources 112, 114 available to high-availability jobs 122a based on a type of resource usage of the jobs 122. For storage capacity usage, the second quota $Q_2$ of the resources 114 available to high-availability jobs 122a is the quantity $R_N$ of the resources 114 available during normal operations. For storage bandwidth usage, the second quota $Q_2$ of the resources 114 available to high-availability jobs 122a is the quantity $R_N$ of the resources 114 available during normal operations minus a quantity $R_L$ of the resources 114 lost due to a tolerated event and minus an increased quantity $R_I$ of the remaining resources 114 needed due to the tolerated event. For other resource usage, the second quota $Q_2$ of the resources 112 available to high-availability jobs 122a is the quantity $R_N$ of the resources 112 available during normal operations minus the quantity $R_L$ of the resources lost due to a tolerated event. The method further includes executing 708 the jobs 122 on the resources 112, 114 of the distributed system 100 and constraining 710 a total usage of the resources 112, 114 by both the high-availability jobs 122a and the low-availability jobs 122b to the quantity $R_N$ of the resources available during normal operations.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover. subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
identifying high-availability jobs and low-availability jobs that demand usage of resources of a distributed system;
determining a first quota of the resources available to low-availability jobs as a quantity of the resources available during normal operations;
determining a second quota of the resources available to high-availability jobs as a quantity of the resources available during normal operations minus a quantity of the resources lost due to a tolerated event;
executing the jobs on the resources of the distributed system; and
constraining a total usage of the resources by both the high-availability jobs and the low-availability jobs to the quantity of the resources available during normal operations; and
leaving jobs assigned to the lost resources without reassigning the jobs to reassigning resources; and
reconstructing any unavailable data associated with the lost resources.

2. The method of claim 1, wherein the resources comprise data processing devices, networking systems, power systems, or cooling systems.

3. The method of claim 2, further comprising migrating or re-executing jobs assigned to resources lost due to the tolerated event to remaining resources.

4. The method of claim 1, wherein the resources comprise non-transitory memory devices.
reconstructing any unavailable data associated with the lost resources.

5. The method of claim 1, further comprising determining the second quota of the resources available to high-availability jobs as:

$$Q_2 = R_N - R_L - R_I$$

wherein $Q_2$ is the second quota, $R_N$ is the quantity of the resources available during normal operations, $R_L$ is the quantity of the resources lost due to a tolerated event, and $R_I$ is an increased quantity of the remaining resources needed due to the tolerated event.

6. The method of claim 1, further comprising determining the second quota of the resource available to high-availability jobs as:

$$Q_2 = \frac{(R_N - R_L)}{(R_N + x * R_L)}$$

wherein $Q_2$ is the second quota, $R_N$ is the quantity of the resource available during normal operations, $R_L$ is the quantity of the resource lost due to a tolerated event, and $x$ is a resource multiplier corresponding to the tolerated event.

7. The method of claim 6, wherein the resource comprises non-transitory memory devices.

8. The method of claim 1, further comprising limiting a sum of the first quota and the second quota to a maximum quota.

9. The method of claim 1, further comprising:
monitoring a usage of the resources by the high-availability jobs; and
when a high-availability job exceeds a threshold usage, downgrading the high-availability job to a low-availability job.

10. The method of claim 1, further comprising suspending or ending at least some of the low-availability jobs for the period of time before the tolerated event.

11. The method of claim 1, further comprising determining the quantity of the resources lost due to a tolerated event based on an assignment of the jobs to particular resources and a system hierarchy of the distributed system, the system hierarchy comprising system domains, each having an active state or an inactive state.

12. The method of claim 1, wherein the system hierarchy comprises system levels comprising:
a first system level corresponding to host machines of data processing devices, non-transitory memory devices, or network interface controllers, each host machine having a system domain;
a second system level corresponding to power deliverers, communication deliverers, or cooling deliverers of racks housing the host machines, each power deliverer, communication deliverer, or cooling deliverer of the rack having a system domain; and
a third system level corresponding to power deliverers, communication deliverers, or cooling deliverers of cells having associated racks, each power deliverer, communication deliverer, or cooling deliverer of the cell having a system domain; and
a fourth system level corresponding to a distribution center module of the cells, each distribution center module having a system domain.

13. The system of claim 1, wherein the resources comprises non-transitory memory devices.

14. A system comprising:
resources of a distributed system; and
a computer processor in communication with the resources, the computer processor:
identifying high-availability jobs and low-availability jobs that demand usage of the resources;

determining a first quota of the resources available to low-availability jobs as a quantity of the resources available during normal operations;
determining a second quota of the resources available to high-availability jobs as a quantity of the resources available during normal operations minus a quantity of the resources lost due to a tolerated event;
executing the jobs on the resources of the distributed system; and
wherein the computer processor:
leaves jobs assigned to the lost resources without reassigning the jobs to remaining resources; and
reconstructs any unavailable data associated with the lost resources.

15. The system of claim 14, wherein the resources comprise data processing devices, networking systems, power systems, or cooling systems.

16. The system of claim 15, wherein the computer processor migrates or re-executes jobs assigned to resources lost due to the tolerated event to remaining resources.

17. The system of claim 14, wherein the computer processor determines the second quota of the resources available to high-availability jobs as:

$$Q_2 = R_N - R_L - R_I$$

wherein $Q_2$ is the second quota, $R_N$ is the quantity of the resources available during normal operations, $R_L$ is the quantity of the resources lost due to a tolerated event, and $R_I$ is an increased quantity of the remaining resources needed due to the tolerated event.

18. The system of claim 14, wherein the computer processor determines the second quota of the resource available to high-availability jobs as:

$$Q_2 = \frac{(R_N - R_L)}{(R_N + x * R_L)}$$

wherein $Q_2$ is the second quota, $R_N$ is the quantity of the resource available during normal operations, $R_L$ is the quantity of the resource lost due to a tolerated event, and x is a resource multiplier corresponding to the tolerated event.

19. The system of claim 18, wherein the resources comprise non-transitory memory devices.

20. The system of claim 14, wherein the computer processor limits a sum of the first quota and the second quota to a maximum quota.

21. The system of claim 14, wherein the computer processor:
monitors a usage of the resources by the high-availability jobs; and
when a high-availability job exceeds a threshold usage, downgrades the high-availability job to a low-availability job.

22. The system of claim 14, wherein the computer processor suspends or ends at least some of the low-availability jobs for the period of time before the tolerated event.

23. The system of claim 14, wherein the computer processor determines the quantity of the resources lost due to a tolerated event based on an assignment of the jobs to particular resources and a system hierarchy of the distributed system, the system hierarchy comprising system domains, each having an active state or an inactive state.

24. The system of claim 23, wherein the system hierarchy comprises system levels comprising:

a first system level corresponding to host machines of data processing devices, non-transitory memory devices, or network interface controllers, each host machine having a system domain;
a second system level corresponding to power deliverers, communication deliverers, or cooling deliverers of racks housing the host machines, each power deliverer, communication deliverer, or cooling deliverer of the rack having a system domain; and
a third system level corresponding to power deliverers, communication deliverers, or cooling deliverers of cells having associated racks, each power deliverer, communication deliverer, or cooling deliverer of the cell having a system domain; and
a fourth system level corresponding to a distribution center module of the cells, each distribution center module having a system domain.

25. A method comprising:
identifying high-availability jobs and low-availability jobs that demand usage of resources of a distributed system;
determining a first quota of the resources available to low-availability jobs as a quantity of the resources available during normal operations;
determining a second quota of the resources available to high-availability jobs based on a resource type, wherein:
for storage capacity resources, the second quota of the resources available to high-availability jobs is the quantity of the resources available during normal operations;
for storage bandwidth resources, the second quota of the resources available to high-availability jobs is the quantity of the resources available during normal operations minus a quantity of the resources lost due to a tolerated event and minus an increased quantity of the remaining resources needed due to the tolerated event; and
for non-storage resource resources, the second quota of the resources available to high-availability jobs is the quantity of the resources available during normal operations minus the quantity of the resources lost due to a tolerated event;
executing the jobs on the resources of the distributed system; and
constraining a total usage of the resources by both the high-availability jobs and the low-availability jobs to the quantity of the resources available during normal operations.

26. The method of claim 25, further comprising, for non-storage resources, migrating or re-executing jobs assigned to resources lost due to the tolerated event to remaining resources.

27. The method of claim 25, further comprising, for storage resources:
leaving jobs assigned to the lost resources without reassigning the jobs to remaining resources; and
reconstructing any unavailable data associated with the lost resources.

28. The method of claim 25, further comprising determining the quantity of the resources lost due to a tolerated event based on an assignment of the jobs to particular resources and a system hierarchy of the distributed system, the system hierarchy comprising system domains, each having an active state or an inactive state.

* * * * *